United States Patent [19]

Henderson

[11] Patent Number: 5,367,361
[45] Date of Patent: Nov. 22, 1994

[54] SYSTEM AND METHOD FOR CONTROLLING VOLTAGES OF ELEMENTS IN AN ELECTROSTATIC PRINTING APPARATUS

[75] Inventor: Thomas A. Henderson, Rochester, N.Y.

[73] Assignee: Xerox Corporation, Stamford, Conn.

[21] Appl. No.: 991,402

[22] Filed: Dec. 16, 1992

[51] Int. Cl.$^5$ .................. G03G 15/02; G03G 15/04; G03G 21/00
[52] U.S. Cl. ........................... 355/208; 355/214
[58] Field of Search ................ 355/208, 214, 219

[56] References Cited

U.S. PATENT DOCUMENTS

| | | | |
|---|---|---|---|
| 5,119,131 | 6/1992 | Paolini et al. | 355/208 |
| 5,138,378 | 8/1992 | MacDonald et al. | 355/208 |
| 5,208,632 | 5/1993 | Hurwitch et al. | 355/208 |
| 5,223,897 | 6/1993 | MacDonald et al. | 355/208 |
| 5,227,270 | 7/1993 | Scheuer et al. | 355/328 X |

Primary Examiner—Fred L. Braun
Attorney, Agent, or Firm—Finnegan, Henderson, Farabow, Garrett & Dunner

[57] ABSTRACT

A method of controlling voltages in a latent image development printer. A printer controller receives three parameters and determines a substrate charging voltage, a development station bias voltage, and a laser power for discharging the substrate, based on the three parameters. The three parameters include a difference between a substrate charging voltage and the development station bias voltage, a difference between the substrate discharging voltage and the development station bias voltage, and a ratio between the discharging voltage minus a residual voltage and the charging voltage minus the residual voltage. The ratio parameter controls the optical density of intermediate gray levels without substantially affecting other qualities of the printing process.

12 Claims, 10 Drawing Sheets

| 33 | 31 | 16 | 23 | 29 | 34 |
|----|----|----|----|----|----|
| 25 | 19 | 8  | 12 | 17 | 27 |
| 21 | 11 | 2  | 1  | 5  | 13 |
| 14 | 7  | 4  | 3  | 9  | 22 |
| 28 | 18 | 10 | 6  | 20 | 26 |
| 35 | 30 | 24 | 15 | 32 | 36 |

SYSTEM AND METHOD FOR CONTROLLING VOLTAGES OF ELEMENTS IN AN ELECTROSTATIC PRINTING APPARATUS

BACKGROUND OF THE INVENTION

1. Field of the Invention

This invention relates to system and method of controlling voltages in a printing apparatus, and more particularly to a system and method of controlling voltages in a printing apparatus employing a charged substrate and toner.

2. Description of the Related Art

In a certain printing method, the image to be reproduced is partitioned into mutually exclusive areas called "halftone cells," each containing a number of pixels. When halftone cells are used with a developable image printer, gray levels are simulated by exposing a subset of the total number of pixels in a halftone cell, to attract toner to the exposed pixels. The pixels are too small for a viewer to perceive individual pixels, and the viewer instead perceives a gray level corresponding to the percentage of halftone cell area that is covered with toner.

Numerous physical conditions within the developable image printer affect various aspects of the appearance of a halftone cell. A variation in a single physical condition may cause a variation in multiple aspects a cell's appearance.

SUMMARY OF THE INVENTION

It is an object of the present invention to control voltages within a printing apparatus to substantially control a single aspect of the appearance of a multipixel cell.

To achieve this and other advantages of the invention, in a reproduction system including a substrate and means for depositing toner onto the substrate, a method of operating the system comprises the steps of receiving a first number N1; receiving a second number N2; receiving a third number N3; charging the depositing means to a first voltage; charging the substrate to produce a second voltage, such that a difference between the second voltage and the first voltage is N1; discharging selected areas of the substrate to produce a third voltage, such that a difference between the third voltage and the first voltage is N2, and a ratio between a function of the second voltage and a function of the third voltage is N3.

The accompanying drawings, which are incorporated in and which constitute a part of this specification, illustrate one embodiment of the invention and, together with the description, explain the principles of the invention.

DESCRIPTION OF THE PREFERRED EMBODIMENTS

Figure 1:
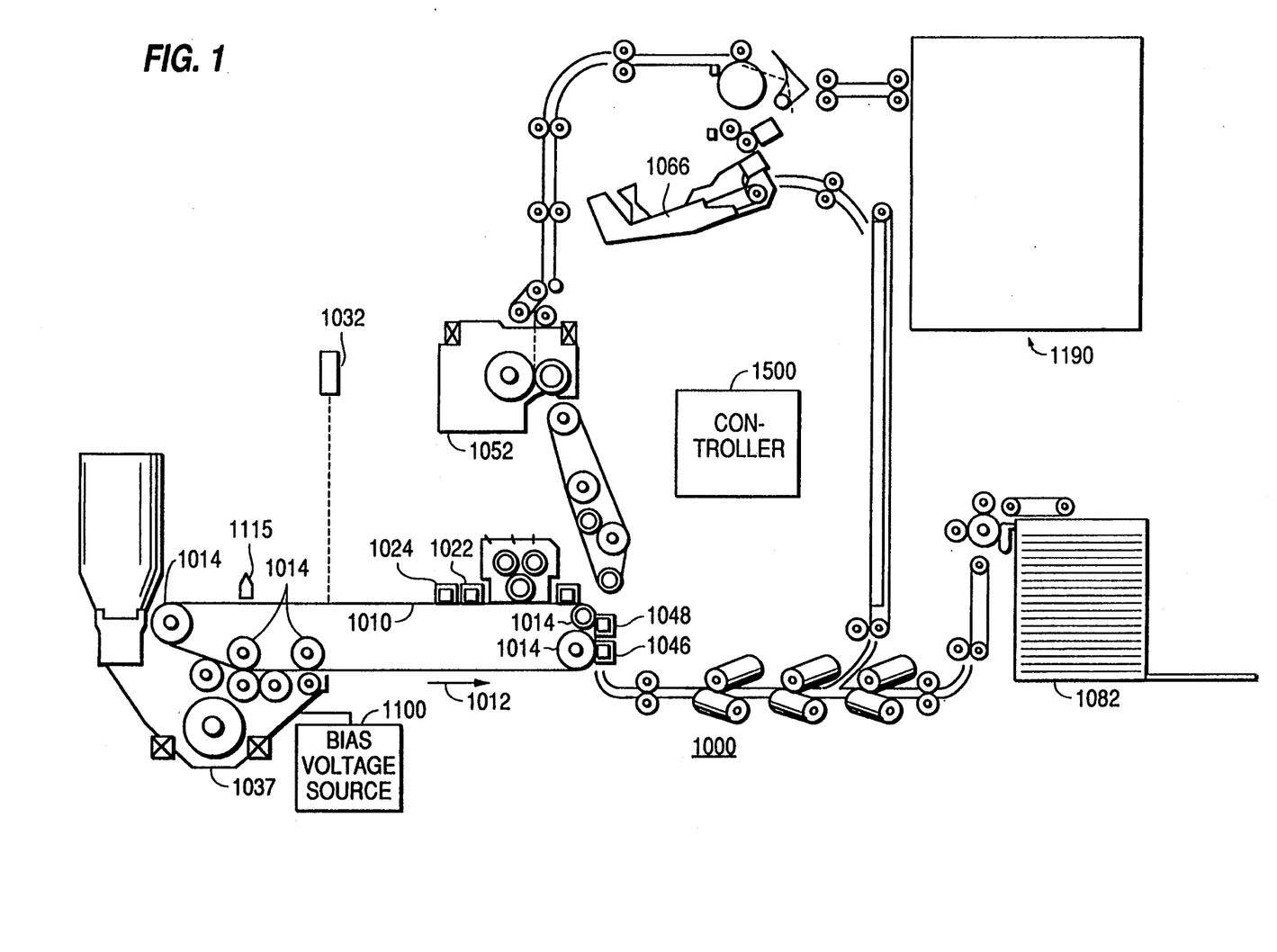
FIG. 1 is a diagram of a printing apparatus of a first preferred embodiment of the invention.

FIG. 1 shows a printing apparatus 1000 of a first preferred embodiment of the present invention. Photoreceptor belt 1010 is entrained around rollers 1014. One or more of roller 1014 is rotated by a motor (not shown) coupled to roller 1014 by suitable means such as a belt drive. As the driven roller rotates, the driven roller advances belt 1010 in the direction of arrow 1012 through the various processing stations disposed around the movement path of belt 1010.

Corotrons 1022 and 1024 operate to charge belt 1010 to a uniform potential. Raster scanning laser 1032 exposes belt 1010 to a pattern of light to render a latent image. Developing station 1037 deposits toner on belt 1010. Bias voltage source 1100 charges developing station 1037. Charge sensor 1115 senses a charge on belt 1010. Controller 1500 controls voltages in the preferred printer, as described in detail later.

First, an area of the belt 1010 passes by corotrons 1022 and 1024 to charge belt 1010 to a relatively high, substantially uniform potential. Next, the area of the belt 1010 passes by laser 1032 to expose selected areas of belt 1010 to a pattern of light, thereby discharging these selected areas to produce an electrostatic latent image. Next, the area of the belt passes developer 1037 to deposit toner on charged areas of the belt. After passing developer 1037, the area of the belt 1010 is exposed to a pretransfer light from a lamp (not shown) to reduce the attraction between belt 1010 and the toner deposited by developer 1037. A corotron 1046 charges a sheet of paper, from paper tray 1082, to an appropriate magnitude so that the paper is tacked to belt 1010 and the toner attracted from belt 1010 to the paper. Subsequently, detack corotron 1048 charges the paper to an opposite polarity to detack the paper from belt 1010. The paper then advances to fuser 1052, which permanently affixes the toner to the paper with heat and pressure. The paper then advances to output section 1190, or to tray 1066 allowing the paper to return to belt 1010 for printing an image on an opposite side of the paper.

Figure 2:
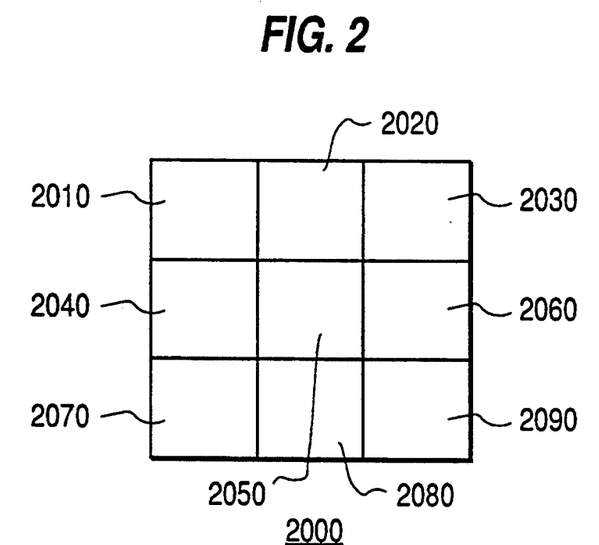
FIG. 2 is a diagram of a halftone cell.

FIG. 2 shows a highly magnified halftone cell 2000 having 9 pixels 2010–2090. To print white, laser 1032 exposes none of the pixels in the cell resulting in the cell shown in FIG. 2. To simulate an intermediate level of gray for the printing of a certain cell, laser 1032 exposes some of the pixels in the cell to attract toner to the exposed pixels. To print black, laser 1032 exposes all pixels in the cell to attract toner to the exposed pixels.

The combination of voltages employed within printer 1000 has an effect on the production of intermediate levels of gray. This effect results from certain phenomena that occur at an interface between an exposed pixel and an unexposed pixel. Depending on the combination of voltages, an unexposed pixel may contain various amounts of toner in an area near an interface with an exposed pixel, thereby affecting the perceived gray level.

Figure 3:
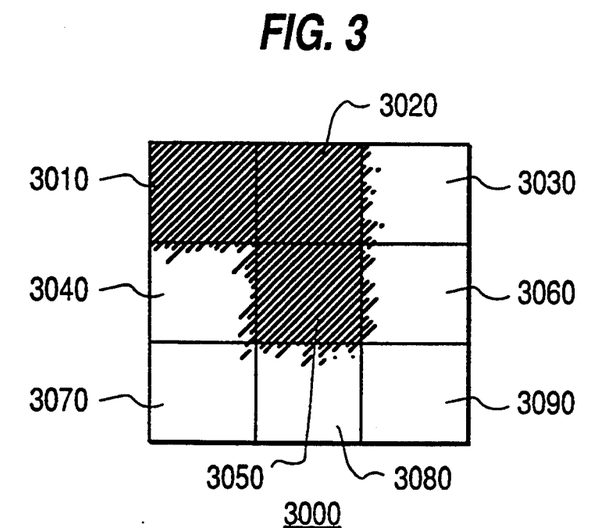
FIG. 3 is a diagram of another halftone cell.

FIG. 3 shows a highly magnified halftone cell in which laser 1032 has exposed 3 of the 9 pixels to produce an intermediate gray level. Laser 1032 has exposed pixels 3010, 3020 and 3050 to attract toner to these exposed pixels. As represented schematically in FIG. 3, unexposed pixels 3040, 3070, 3080, 3090, 3060 and 3030 contain toner resulting from the exposure of pixels 3010, 3020 and 3050.

Figure 4:
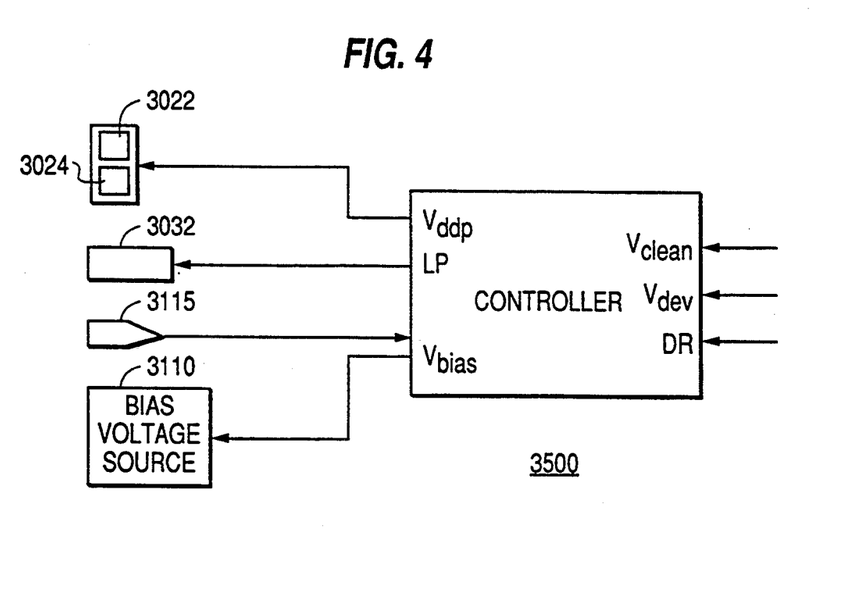
FIG. 4 is another diagram of the printing apparatus of the first preferred embodiment of the present invention.

FIG. 4 shows controller 1500 for printer 1000 the preferred printing apparatus. Controller 1500 includes a general purpose computer executing a controller program. Controller 1500 controls a charge on belt 1010 by controlling corotrons 1022 and 1024 in accordance with a parameter $V_{ddp}$, described below. Controller 1500 also controls a power of laser 1032 in accordance with a parameter LP, and controls bias voltage source 1100 in accordance with a parameter $V_{bias}$, described below. Controller 1500 receives input parameters $V_{clean}$, $V_{dev}$ and DR described below, and an output of charge sensor 1115.

The parameter $V_{clean}$ received by controller 1500 controls a voltage difference between belt 1010, after charging by corotrons 1022 and 1024, and the rollers in developer 1037. An electric field produced by this voltage difference is sometimes called the "cleaning field," because this electric field tends to suppress the deposition of background toner on white pixels, such as pixel 2090 in FIG. 2. Printer 1000 initially sets $V_{clean}$ to 100 volts to suppress the deposition of background while providing adequate reproduction of grey levels close to white.

The parameter $V_{dev}$ received by controller 1500 controls a voltage difference between belt 1010, after exposure by laser 1032, and the rollers in developer 1037. An electric field produced by this voltage difference is sometimes called the "development field," because this electric field tends to promote the deposition of toner on exposed pixels. Printer 1000 initially sets $V_{dev}$ to 250 volts to obtain a density of 1.8 density units in black pixels, such as pixel 3020 in FIG. 3, where a density unit is -log (reflection ratio)=-log (sample reflectance)÷- (reference light reflectance).

The preferred embodiment of the present invention employs a discharge ratio DR defined as:

$$DR=(V_{ex}-V_{rsl})/(V_{ddp}-V_{rsl})$$

where $V_{ddp}$ is a charge on belt 1010 at a point downstream from corotrons 1022 and 1024; and $V_{ex}$ is a charge on an area of belt 1010 that has been exposed by laser 1032. $V_{rsl}$ is a residual voltage obtained when the photoreceptor is maximally discharged by light. $V_{rsl}$ is reached when additional exposure power increases cause negligible additional voltage discharge.

The parameter DR received by controller 1500 specifies the discharge ratio in printer 1000. The discharge ratio is a factor determining the amount of toner deposited near an edge in an unexposed pixels, such as pixel 3030 in FIG. 3, resulting from exposure of an adjacent pixel, such as pixel 3020. Printer 1000 initially sets DR to 0.1 to produce an amount of toner in a cell that is a roughly linear function of the percentage of exposed pixels in the cell.

Figure 5:
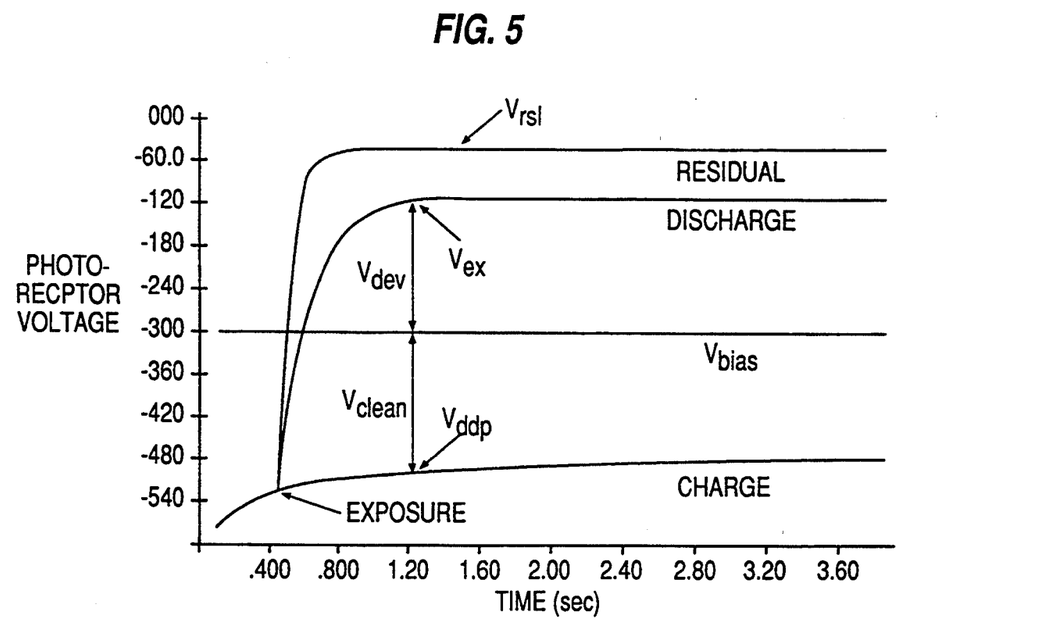
FIG. 5 is a graph illustrating voltages employed by the printing system of the first preferred embodiment of the invention.

FIG. 5 shows voltages employed by printer 1000 to achieve latent image formation. An electrostatic voltmeter placed 1.2 seconds after charging would measure the indicated $V_{ddp}$ and $V_{ex}$. $V_{rsl}$ is a physical characteristic of the particular materials used for belt 1010. $V_{rsl}$ is measured by controller 1500, as described later.

The discharge ratio may be conceptualized as corresponding to the location of a range, defined by $V_{clean}$ and $V_{dev}$, relative to the $V_{rsl}$. In FIG. 5, the discharge ratio is approximately 0.16.

Figure 6:
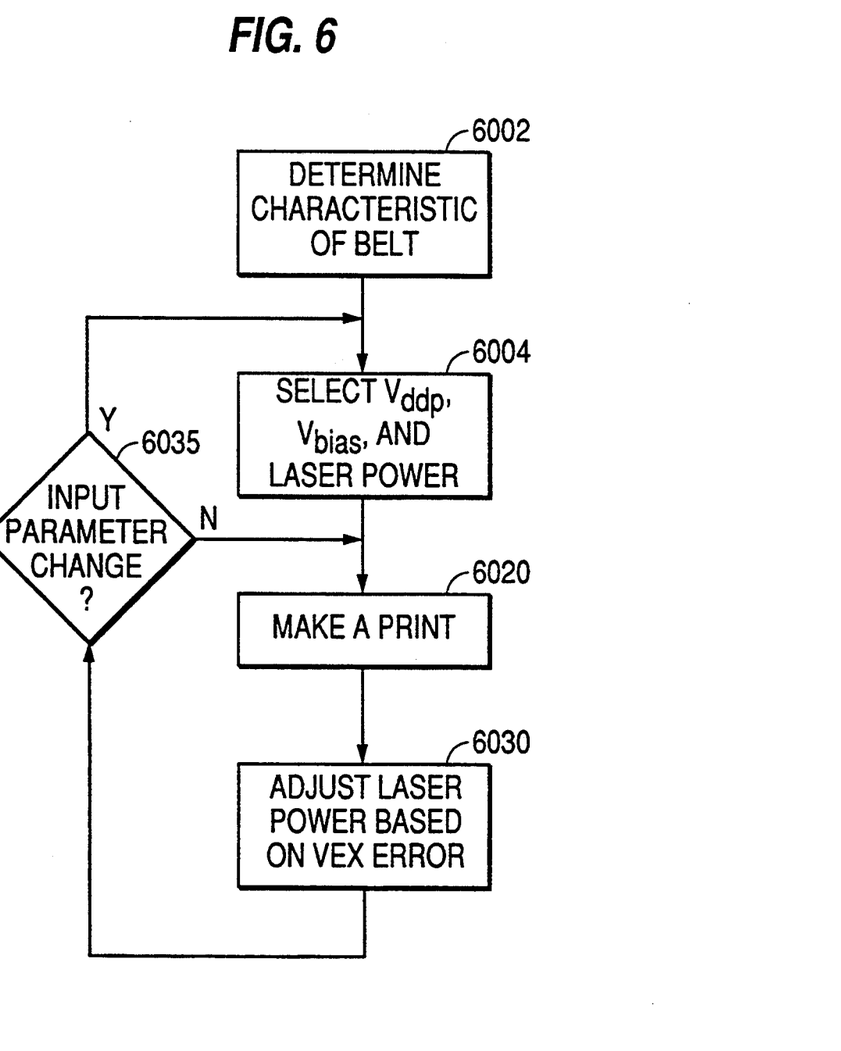
FIG. 6 is a flow diagram showing an operation of the first preferred embodiment of the present invention.

FIG. 6 shows a processing of controller 1500 to set a belt charge $V_{ddp}$, a laser power LP and a $V_{bias}$ in response to the received input parameters $V_{clean}$, $V_{dev}$, and DR. Certain characteristics of belt 1010 are determined (step 6002). Step 6002 is preferably performed upon the power-up of printer 1000, before images on paper are produced.

Figure 7:
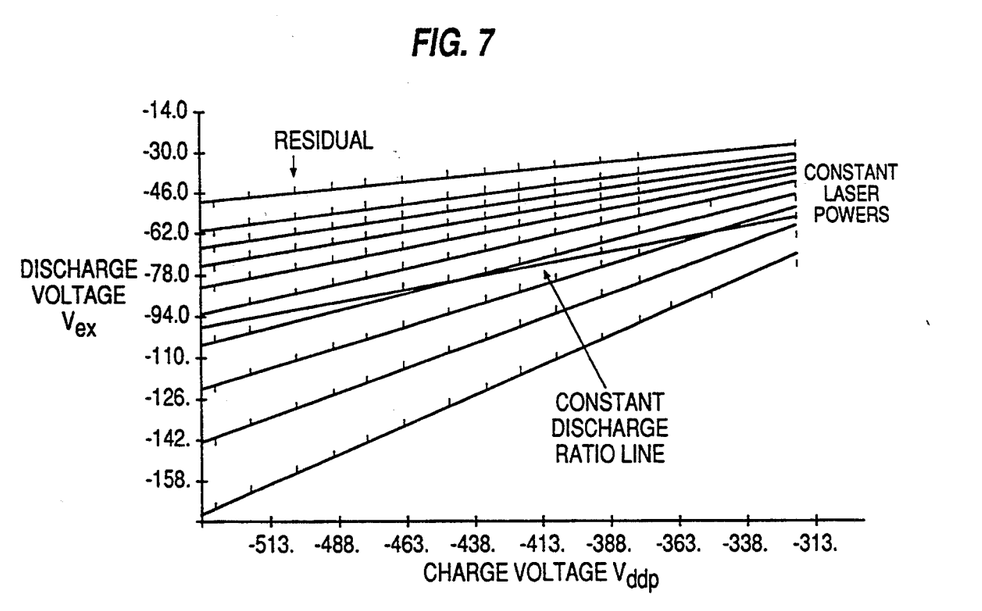
FIG. 7 is a graph showing data acquired by the first preferred printing apparatus.

FIG. 7 shows data acquired by controller 1500 in step 6002. A matrix is developed by performing measurements at different values of $V_{ddp}$ and $V_{ex}$. Each of the 10 curves of FIG. 7 represents data collected at a certain laser 1032 constant exposure power. The sixteen points that each curve follows are the measured $V_{ex}$ at 16 different $V_{ddp}$ levels. Also shown is the line of constant discharge ratio DR.

A $V_{ddp}$, $V_{bias}$ and LP are selected based on the input parameters and on characteristics of belt 1010 determined in step 6002 (step 6004). More specifically, the following equations determine $V_{ddp}$, $V_{bias}$ and $V_{ex}$:

$$V_{dev}+V_{clean}=V_{contrast}$$

$$V_{ddp}-V_{ex}=V_{contrast}$$

Using the formula for DR to solve for $V_{ex}$, $V_{ddp}$ is:

$$V_{ddp}=[V_{contrast}/(1-DR)]+V_{rsl},$$

and $V_{bias}$ is:

$$V_{ddp}-V_{clean}=V_{bias}.$$

The $V_{ex}$ required to meet the $V_{dev}$, $V_{clean}$ and DR specification is:

$$V_{ddp}-V_{contrast}=V_{ex}.$$

Controller 1500 uses the data of FIG. 7 to set a laser 1032 exposure power LP to achieve the $V_{ex}$ that results in the specified $V_{dev}$, $V_{clean}$ and DR. Controller 1500 effectively constrains $V_{ex}$ to be on the line of constant DR, relative to the residual curve, shown in FIG. 7. This line of constant DR correlates $V_{ex}$ values with $V_{ddp}$ values. Each intersection point of the line of constant DR with any of the 10 curves of constant exposure power gives a guide to the appropriate laser 1032 exposure power LP for a given $V_{ddp}$. For each intersection a pair of power, charge values is obtained. A mathematical curve fit of these two variables, using charge as the independent variable, yields a function that converts $V_{ddp}$ (charge) into a laser power that produces a $V_{ex}$ consistent with the DR value (step 6004). Controller 1500 calculates a new line of constant discharge ratio each time step 6004 is performed.

Subsequently, the printing apparatus makes prints (Step 6020), and adjusts laser power (Step 6030). If one or more of the input parameters $V_{clean}$, $V_{dev}$ or DR change (step 6035), controller 1500 performs step 6004 again.

Laser 1032 is configured as a raster output scanner (ROS) capable of varying exposure power quickly to a number of values in the time that it would normally take to print an image. The data shown in FIG. 7 is the $V_{ex}$ result of 10 exposure powers measured at each of 16 $V_{ddp}$ levels in 16 passes of the photoreceptor, one pass for each $V_{ddp}$ level.

The top curve in FIG. 7 corresponds a laser power that discharges belt 1010 to a residual voltage meaning that higher laser powers do not cause further discharge of belt 1010 within the exposure time of laser 1032. In other words, the top curve corresponds to laser powers that result in the residual voltage $V_{rsl}$. This residual voltage is somewhat dependent on $V_{ddp}$, an embellishment on the equations above that will be described later.

Figure 8:
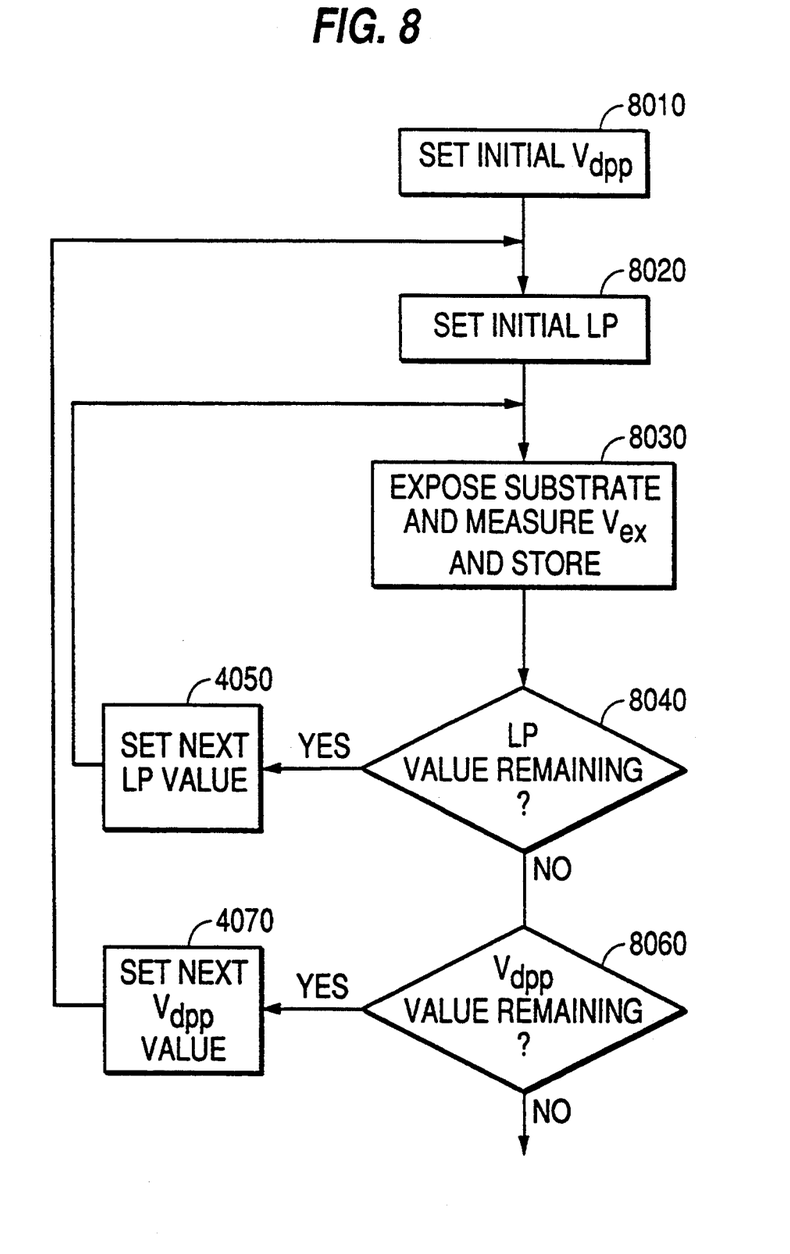
FIG. 8 is a flow diagram showing a processing of the flow diagram of FIG. 6 in more detail.

FIG. 8 shows a processing of step 6002 of FIG. 6 in more detail. FIG. 8 shows a processing of controller 1500 to collect the data shown in FIG. 7. Initial substrate charge and laser powers are selected (Steps 8010 and 8020). The substrate is exposed with the currently selected laser power and the resulting discharged voltage measured by charge sensor 1115 $V_{ex}$ is stored. If laser powers remain (Step 8040), a next laser power is selected (Step 8050) and a new exposed and measuring step is performed. If no laser powers remain, it is determined whether any values for $V_{ddp}$ remain (Step 8060) and if other values of $V_{ddp}$ remain a new value for $V_{ddp}$ is set (Step 8070) and control returns to Step 8020.

In other words, controller 1500 performs the steps of charging the substrate to each of a plurality of predetermined voltages; exposing, for each predetermined voltage, the substrate to each of a plurality of predetermined radiation powers; measuring, for each radiation power, a charge on the substrate after the exposing step; and determining a radiation power by using a result of the measuring step to interpolate between two of the plurality of predetermined radiation powers. During printing, printer 1000 exposes belt 1010 with the determined radiation power.

In general, there will be error in $V_{ex}$ which may result from changes in the photoreceptor characteristics with age or environment that have occurred since step 6002 was performed. Another error source is small deviations of real photoreceptor behavior from the behavior predicted by the mathematical curve fit described above. An error feedback calculation adjusts the exposure power to minimize $V_{ex}$ error and compensate for these errors. In FIG. 7, an imaginary vertical line at the measured $V_{ddp}$ can be drawn. This line also intersects the lines of constant laser power and each intersection can be used to create LP, $V_{ex}$ pairs. A functional fit using $V_{ex}$ as the independent variable allows a power correction to be calculated that will return $V_{ex}$ to zero error. This power correction value is adjusted on each revolution of belt 1010 in accordance with the measured error.

Printer 1000 may be configured with a wide variety of photoreceptors and exposure sources. A preferred embodiment of the invention configures printer 1000 with an organic infrared sensitive photoreceptor exposed by an infrared laser diode source.

The data in the graph of FIG. 7 was acquired from the organic infrared sensitive photoreceptor. In this case, $V_{ex}$ is substantially a linear function of $V_{ddp}$ at constant laser power. This set of lines at various powers can be expressed as:

$$V_{ex} = a_i(V_{ddp}) + b_i \text{ } i \text{ over all laser powers (LP)}$$

In an alternative embodiment employing inorganic visible light sensitive photoreceptor and a HeNe laser, the above relation was found to be quadratic.

To determine an equation for the line of constant discharge ratio, the dependence of the residual voltage $V_{rsl}$ on $V_{ddp}$ is determined. For both the inorganic visible light sensitive and organic infrared sensitive photoreceptors, a linear relation is adequate to calculate $V_{rsl}$ from $V_{ddp}$:

$$V_{rsl} = a_0(V_{ddp}) + b_0$$

From this relation and the definition of DR, the equation for the line of constant discharge ratio is:

$$V_{ex} = V_{ddp}[DR(1-a_0) + a_0] + b_0(1-DR)$$

Next the intersection points of the constant discharge ratio line and the sets for constant laser power are used to determine LP, $V_{ddp}$ data pairs:

$$V_{ddp,i} = [b_i - b_0(1-DR)]/[a_0 - a_i + DR(1-a_0)-] - \text{over all LP}$$

Figure 9:
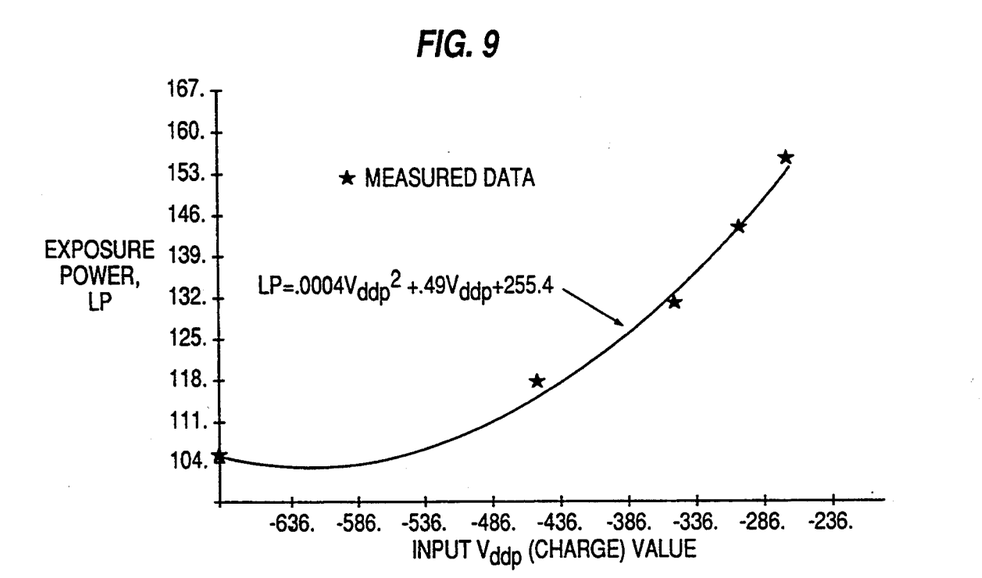
FIG. 9 is a graph showing a relationship between substrate charge voltage and laser exposure power in the preferred printer.

FIG. 9 shows a relationship between $V_{ddp}$ and laser power LP for a particular DR. For organic infrared sensitive photoreceptor the LP, $V_{ddp}$ pairs substantially fit to a quadratic equation, as shown in FIG. 9. The intersection points as seen in FIG. 7 are used to generate 5 pairs of LP, $V_{ddp}$. A parabola is fitted to these 5 pairs of values. The coefficients of the fitted curve are used to calculate an initial LP from $V_{ddp}$. In FIG. 9, the functional values diverge slightly at high charges, which is inconsistent with the actual data. This divergence is an artifact of the fitting equation and can introduce an error in the initial setting of LP by controller 1500. Controller 1500 employs feedback to readjust the setting of LP, thereby compensating for the error introduced by the divergence and for error introduced by physical changes occurring after the initial setting of LP.

Thus, for an organic infrared sensitive photoreceptor, the initial exposure power LP is:

$$LP = q_2 V_{ddp}^2 + q_1 V_{ddp} + q_0,$$

where the q coefficients describe the parabolic section in FIG. 9.

The analogous relation for an alternative embodiment employing inorganic visible light sensitive photoreceptor is a substantially linear function of $V_{ddp}$.

Figure 10:
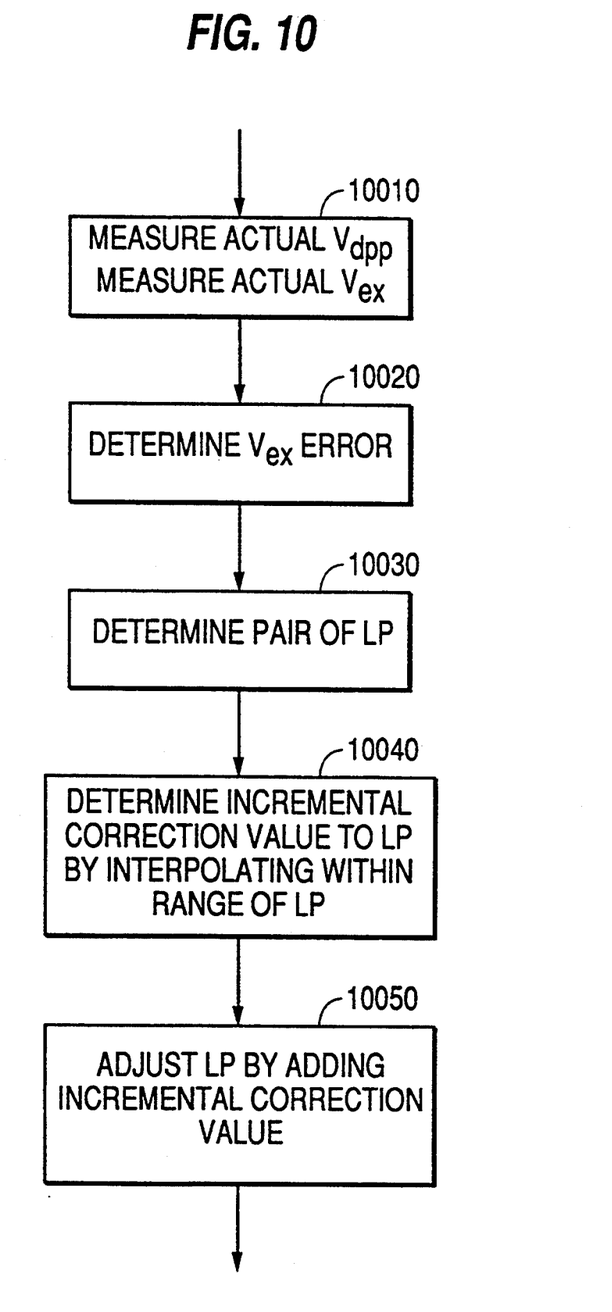
FIG. 10 is a flow diagram showing a processing of the flow diagram of FIG. 6 in more detail.

FIG. 10 shows a processing of step 6030 of FIG. 6 in more detail. Charge sensor 1115 measures an actual $V_{ddp}$, and an actual $V_{ex}$ (Step 10010). The measured $V_{ddp}$ is used to determine a target $V_{ex}$ to achieve the discharge ratio DR, thereby determining a (Step 10020). A pair of laser powers that yield $V_{ex}$ values that include the actual $V_{ex}$ at the actual $V_{ddp}$ is determined (Step 10030).

In other words, to determine the feedback power correction, the data of FIG. 7 is used again. Assuming that on the present belt revolution the $V_{ddp}$ measured by charge sensor 1115 is Z volts, and according to the equations describing $V_{ex}$ as a function of $V_{ddp}$ at constant laser powers, a set of LP, $V_{ex}$ pairs is:

$$V_{ex,i} = a_i Z + b_i \text{ for all } LP_i$$

Two pairs are chosen having $V_{ex}$ values that bracket the actual $V_{ex}$ measured on this pass.

An incremental correction to the laser power is determined (Step 10040), and the laser power is adjusted using the determined incremental correction value (Step 10050). More specifically, $\Delta LP/\Delta V_{ex}$ slope, defined by the two pairs, is calculated and multiplied by the $V_{ex}$ error ($V_{ex\text{-}error}$) to obtain an LP correction. The LP correction value is subtracted from the current LP value:

$$\text{New LP} = \text{Current LP} - V_{ex\text{-}error}[\Delta LP/\Delta V_{ex}].$$

An alternative approach would be to perform a complete mathematical fit of the LP, $V_{ex}$ pairs.

In other words, in addition to measuring a substrate voltage to collect the data of FIG. 7 and determining a radiation power based on the data of FIG. 7, the preferred method includes the step of exposing the substrate to the determined radiation power; a second measuring step of measuring a voltage on the substrate after the exposing step; and redetermining a radiation power in accordance with the second measuring step.

As printing proceeds and the photoreceptor susceptibility to exposure changes, the redetermining of the radiation power compensates for the changes and maintains a low $V_{ex}$ error.

Figure 11:
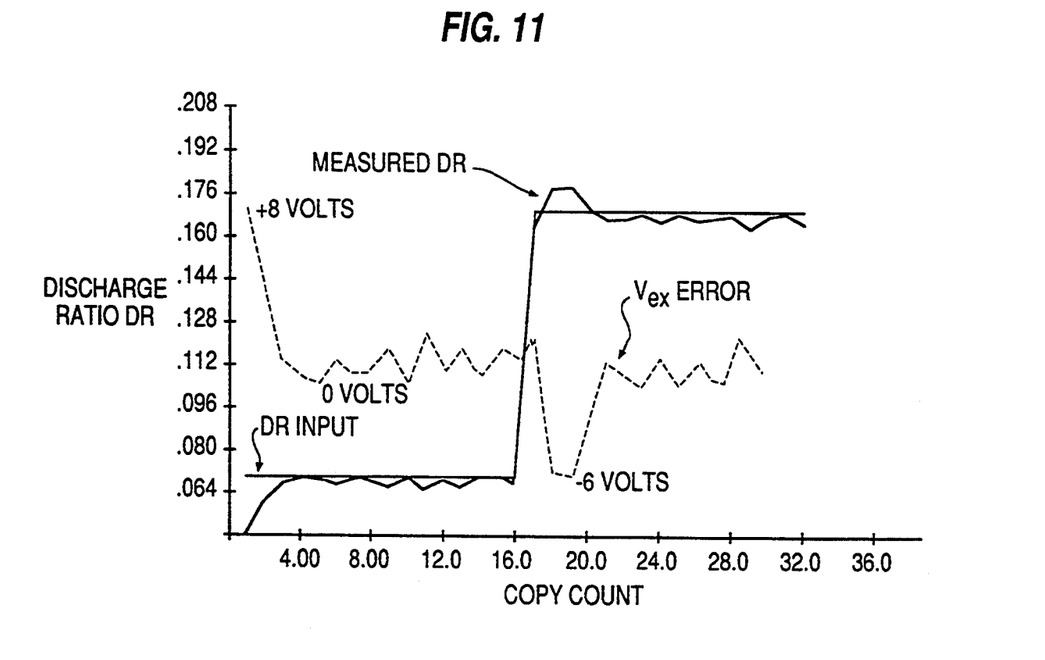
FIG. 11 is a graph showing a step input response of the preferred printer.

FIG. 11 shows a response of controller 1500 to a step change at the DR input. The discharge ratio computed from measurements taken at an electrostatic voltmeter is plotted along with the DR input to controller 1500. The DR input was changed in the middle of a 32 print run. Also shown is the $V_{ex}$ error in volts, which indicates that there was a period of approximately three prints at the start of the run where the results of steps 10010–10050 converged to achieve substantially zero $V_{ex}$ error. At the sixteenth print, when the DR input changes, controller 1500 used the data of FIG. 7 to follow the DR input. Small variations in $V_{ex}$ error are evident as the feedback control processing of steps 10010–10050 adjusted to the new DR input.

Figure 12:
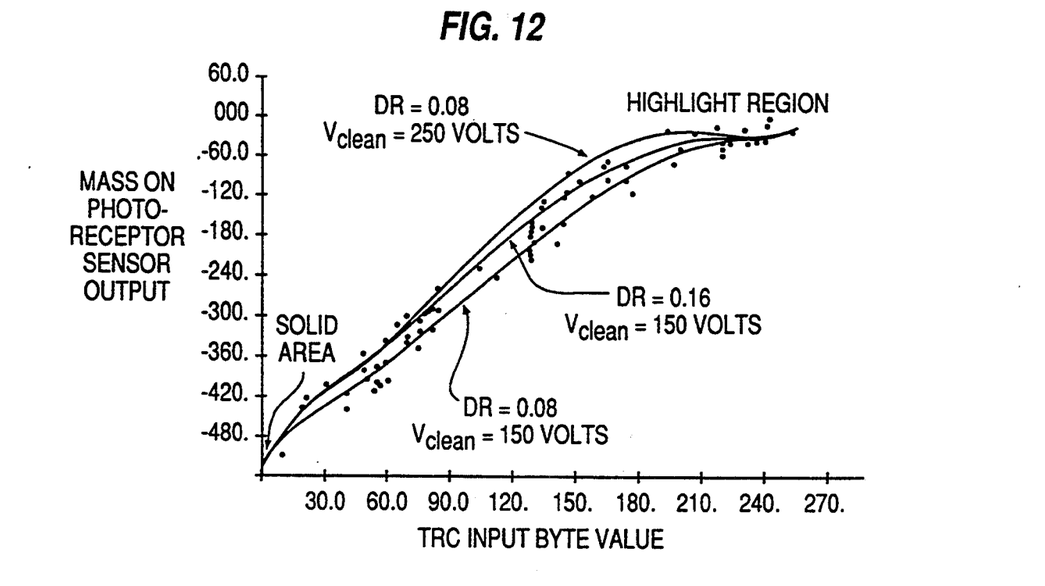
FIG. 12 is a graph showing an effect of the first preferred embodiment of the invention.

FIG. 12 shows three curves relating a percentage of pixels exposed in a cell, on the horizontal axis, with an amount of toner deposited in the cell, on the vertical axis. These three curves were each produced by a 5th order polynomial fit to experimental data. Comparing the two curves of constant $V_{clean}$ and changing DR shows that the effect of a change in DR is to alter the middle of the curve while leaving the endpoints unchanged. In contrast, a change in $V_{clean}$ at a constant DR affects mainly the highlight end of the curve, thereby demonstrating that controller 1500 can control the curve shape substantially independently of black level optical density.

Printer 1000 may adjust DR to maintain a 50% halftone dot density, and may adjust $V_{dev}$ to maintain solid area tone density.; Printer 1000 might also adjust $V_{clean}$ to maintain a certain suppression of background. Printer 1000 may perform automatic adjustment of these parameters in response to physical changes in printer 1000 caused by, for example, a change in room humidity. Printer 1000 may perform automatic adjustment of these parameters by exposing test patches of the belt 1010 with laser 1032 and developing the test patches with developer 1037. Subsequently, an amount of toner on the test patches is measured. The test patches are on an interdocument gap on belt 1010 so that the normal printing of paper is not adversely affected by the adjustment process.

Figure 13:
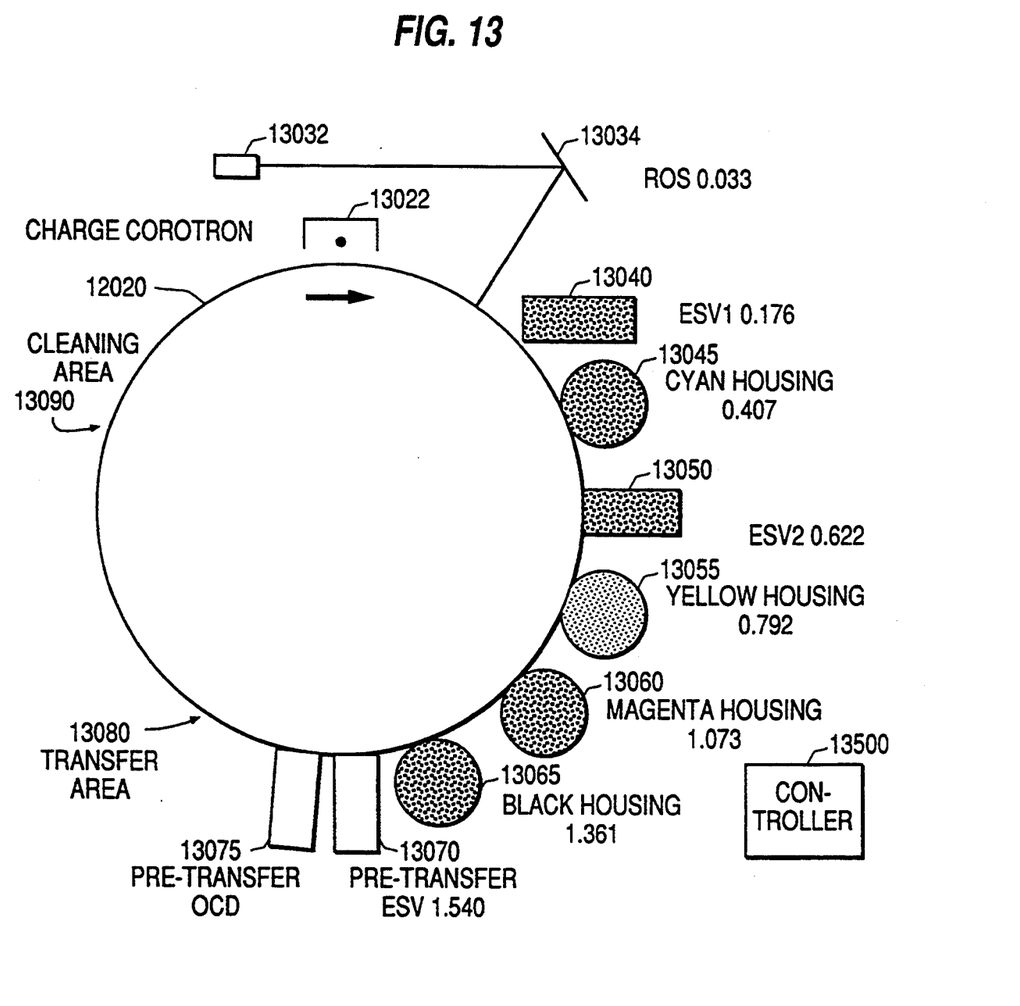
FIG. 13 is a diagram of a printing apparatus of a second preferred embodiment of the invention.

FIG. 13 shows a schematic diagram of a printing apparatus of a second preferred embodiment of the present invention, including a visible light sensitive inorganic photoreceptor 13020, charge corotron 13022, laser 13032, mirror 13034, and controller 13500. An electrostatic volt meter 13040 opposes photoreceptor 13020 at a location 0.176 seconds downstream from a reference location. Cyan developer 13045 is located 0.407 seconds downstream from the reference location, electrostatic voltmeter 13050 is located 0.622 downstream form the reference location, yellow developer 13055 is located 0.792 seconds downstream from the reference location, magenta developer 13060 is located 1.073 seconds downstream from the reference location, black developer 13065 is located 1.361 seconds downstream from the reference location, and pre-transfer electrostatic voltmeter 13070 is located at 1.549 seconds downstream from the reference location. Optimized color densitometer 13075 is located adjacent pre-transfer electrostatic voltmeter 13070.

With the second preferred embodiment of the present invention, to print four colors photoreceptor 13020 is rotated four times, one time for each color, and a single copy sheet is brought into contact with photoreceptor 13080 four times. On each rotation, only one of cyan developer 13045, yellow developer 13055, magenta developer 13060, or black developer 13065 is activated.

Electrostatic volt meter 13050 allows for a prediction of charge decay, by taking a measurement that is compared to a measurement taken by electrostatic volt meter 13040.

Controller 13500 includes four independent subcontrollers, one for each color. Each subcontroller uses a common set of set photoreceptor characterization data, such as the data shown in FIG. 7. Each subcontroller has a respective constant discharge ratio line, since each color may have a different DR set point. Each color will also have a different charge voltage $V_{ddp}$ at the measurement point of electrostatic voltmeter 13050.

Figure 14:
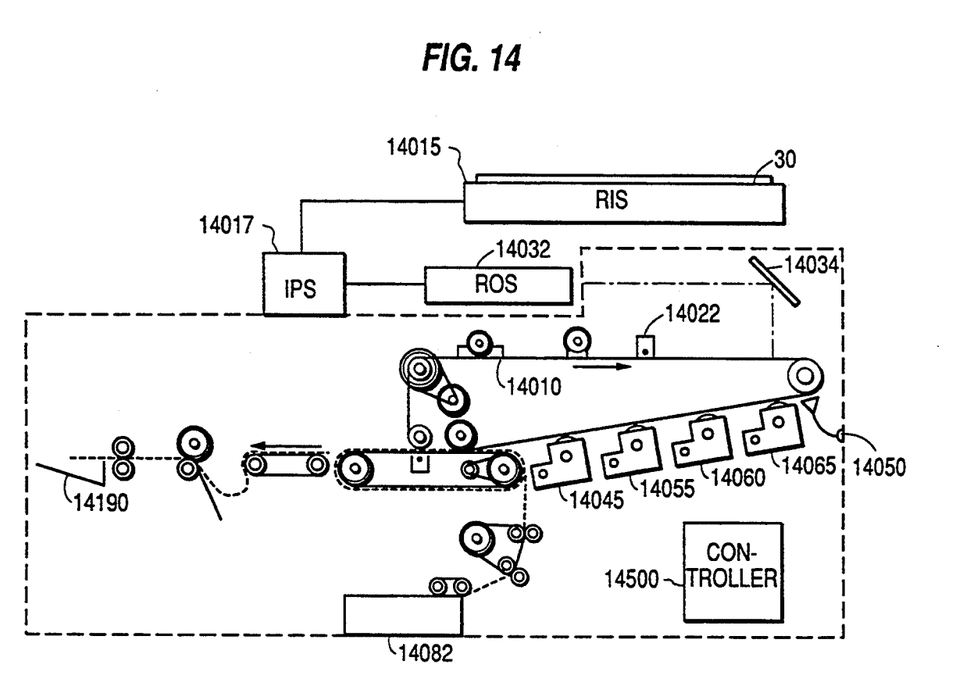
FIG. 14 is a diagram of a printing apparatus of a third preferred embodiment of the invention.

FIG. 14 shows a printing apparatus of a third preferred embodiment of the present invention, including a raster input section 14015, and image processing section 14017, a raster output section 14032, which includes a laser, a mirror 14034, a photoreceptor 14010, a corotron 14022, and electrostatic voltmeter 14050, developer 14045, developer 14055, developer 14060, developer 14065, a paper tray 14082, an output section 14190, and a controller 14500.

Thus, the preferred embodiments of the present invention provide a method to adjust voltages to allow relatively independent control of toner quantities for black, white, and intermediate density level cells. A controller translates three xerographic parameters, $V_{dev}$, $V_{clean}$, and DR, into appropriate control of the physical xerographic elements of a photoreceptor charging device, developer bias and laser exposure intensity. The DR parameter controls the optical density of intermediate grey levels, without substantial secondary effects on solid area density or background toner deposition. Conversely, if the charging level should be altered for any reason, such as an alteration of $V_{dev}$ or $V_{clean}$, the exposure intensity is correspondingly altered to maintain DR. This independent control facilitates automation of the printing process, allowing print quality to remain constant when factors such as room humidity vary.

Although the preferred embodiments operate to charge a photoreceptor to a positive voltage, alternative embodiments of the invention may operate to charge the substrate to a negative voltage. When negative voltages are employed, unexposed pixels attract toner.

Figure 15:
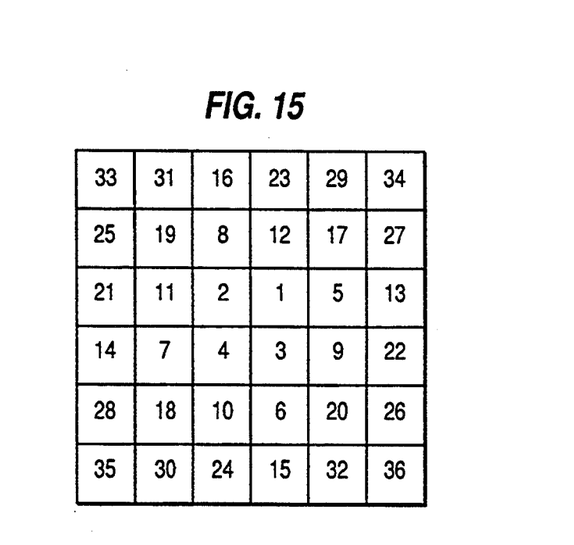
FIG. 15 is a diagram of another halftone cell.

FIG. 15 shows an alternative half-tone cell arrangement including 36 pixels per cell. Other cell arrangements are possible, including cell arrangements having more than 100 pixels per cell.

Additional advantages and modifications will readily occur to those skilled in the art. The invention in its broader aspects is therefore not limited to the specific details, representative apparatus, and illustrative examples shown and described. Various modifications and variations can be made to the present invention without departing from the scope or spirit of the invention, and it is intended that the present invention cover the modifications and variations provided they come within the scope of the appended claims and their equivalents.

We claim:

1. In a reproduction system including a substrate and means for depositing toner onto the substrate, a method of operating the system comprising the steps of:
   receiving a first number N1 representing a relative substrate voltage;
   receiving a second number N2 representing another relative substrate voltage;
   receiving a third number N3 representing a ratio between two voltage quantities;
   charging the depositing means to a first voltage;
   charging the substrate to produce a second voltage, such that a difference between the second voltage and the first voltage is N1;
   discharging selected areas of the substrate to produce a third voltage, such that a difference between the third voltage and the first voltage is N2, and a ratio between the third voltage minus a residual voltage, and the second voltage minus the residual voltage is N3.

2. The method of claim 1, wherein the discharging step includes the substep of
   exposing the substrate to radiation.

3. The method of claim 1, wherein the method further includes the steps of
   charging the substrate to produce each of a plurality of predetermined voltages;
   exposing, for each predetermined voltage, the substrate to each of a plurality of predetermined radiation powers;
   measuring, for each radiation power, a voltage on the substrate after the exposing step; and
   determining a radiation power in accordance with the measuring step, and
   wherein the discharging step includes the substep of
   exposing the substrate to the determined radiation power.

4. The method of claim 3, wherein the determining step includes the substep of
   determining the radiation power by using a result of the measuring step to interpolate between two of the plurality of predetermined radiation powers.

5. The method of claim 1, wherein the method further includes the steps of
   charging the substrate to produce each of a plurality of predetermined voltages;
   exposing, for each predetermined voltage, the substrate to each of a plurality of predetermined radiation powers;
   a first measuring step of measuring, for each radiation power, a voltage on the substrate after the exposing step; and
   determining a radiation power in accordance with the first measuring step, and
   wherein the discharging step includes the substep of
   exposing the substrate to the determined radiation power, and
   wherein the method further includes the steps of
   a second measuring step of measuring a voltage on the substrate after the exposing step; and
   redetermining a radiation power in accordance with the second measuring step, and
   wherein the discharging step further includes the substep of
   exposing the substrate to the redetermined radiation power.

6. The method of claim 1, further including the step of determining a radiation power,
   wherein the discharging step includes the substep of
   exposing the substrate to the determined radiation power, and
   wherein the method further includes the steps of
   measuring a voltage on the substrate after the exposing step; and
   redetermining a radiation power in accordance with the measuring step, and
   wherein the discharging step further includes the substep of
   exposing the substrate to the redetermined radiation power.

7. A reproduction system comprising:
   a substrate;
   means for depositing toner onto the substrate;
   means for receiving a first number N1 representing a relative substrate voltage;
   means for receiving a second number N2 representing another relative substrate voltage;
   means for receiving a third number N3 representing a ratio between two voltage quantities;
   means for charging the depositing means to a first voltage;
   means for charging the substrate to produce a second voltage, such that a difference between the second voltage and the first voltage is N1;
   means for discharging selected areas of the substrate to produce a third voltage, such that a difference between the third voltage and the first voltage is N2, and a ratio between the third voltage minus a residual voltage, and the second voltage minus the residual voltage is N3.

8. The system of claim 7, wherein the discharging means includes
   means for exposing the substrate to radiation.

9. The system of claim 7, further including
   means for charging the substrate to produce each of a plurality of predetermined voltages;
   means for exposing, for each predetermined voltage, the substrate to each of a plurality of predetermined radiation powers;
   means for measuring, for each radiation power, a voltage on the substrate after operation of the exposing means; and means for determining a radiation power in accordance with the operation of the measuring means,
wherein the discharging means includes
means for exposing the substrate to the determined radiation power.

10. The system of claim 9, wherein the determining means includes
means for determining the radiation power by using a result of the measuring means to interpolate between two of the plurality of predetermined radiation powers.

11. The system of claim 7, further including
means for charging the substrate to produce each of a plurality of predetermined voltages;
means for exposing, for each predetermined voltage, the substrate to each of a plurality of predetermined radiation powers;
a first means for measuring, for each radiation power, a voltage on the substrate after operation of the exposing means; and
means for determining a radiation power in accordance with the first measuring means,
wherein the discharging means includes
means for exposing the substrate to the determined radiation power, and wherein the system further includes
a second means for measuring a voltage on the substrate after operation of the exposing means; and
means for redetermining a radiation power in accordance with the second measuring means, and
wherein the discharging means further includes
means for exposing the substrate to the redetermined radiation power.

12. The system of claim 7, further including means for determining a radiation power,
wherein the discharging means includes
means for exposing the substrate to the determined radiation power, and wherein the system further includes
means for measuring a voltage on the substrate after operation of the exposing means; and
means for redetermining a radiation power in accordance with the measuring means, and
wherein the discharging means further includes
means for exposing the substrate to the redetermined radiation power.

* * * * *